United States Patent
Stauffer et al.

(10) Patent No.: US 12,238,020 B2
(45) Date of Patent: Feb. 25, 2025

(54) ENHANCING PERFORMANCE OF DOWNLINKS BETWEEN USER EQUIPMENT AND ACTIVE COORDINATION SETS

(71) Applicant: GOOGLE LLC, Mountain View, CA (US)

(72) Inventors: Erik Stauffer, Mountain View, CA (US); Jibing Wang, San Jose, CA (US)

(73) Assignee: Google LLC, Mountain View, CA (US)

(*) Notice: Subject to any disclaimer, the term of this patent is extended or adjusted under 35 U.S.C. 154(b) by 453 days.

(21) Appl. No.: 17/432,054

(22) PCT Filed: Feb. 20, 2020

(86) PCT No.: PCT/US2020/018980
§ 371 (c)(1),
(2) Date: Aug. 18, 2021

(87) PCT Pub. No.: WO2020/172372
PCT Pub. Date: Aug. 27, 2020

(65) Prior Publication Data
US 2022/0131665 A1    Apr. 28, 2022

Related U.S. Application Data

(60) Provisional application No. 62/808,048, filed on Feb. 20, 2019.

(51) Int. Cl.
*H04L 5/00* (2006.01)
*H04B 7/024* (2017.01)
(Continued)

(52) U.S. Cl.
CPC ........... *H04L 5/0035* (2013.01); *H04B 7/024* (2013.01); *H04B 7/0617* (2013.01); *H04L 5/0048* (2013.01); *H04W 72/044* (2013.01)

(58) Field of Classification Search
None
See application file for complete search history.

(56) References Cited

U.S. PATENT DOCUMENTS

| 7,876,840 B2 | 1/2011 | Tong et al. |
| 9,686,772 B2 | 6/2017 | Chen et al. |

(Continued)

FOREIGN PATENT DOCUMENTS

| CN | 109327861 A | 2/2019 |
| WO | 2018129319 A1 | 7/2018 |

OTHER PUBLICATIONS

3GPP TSG RAN WG1 Meeting #88 R1-1702259 Athens, Greece Feb. 13-17, 2017 (Year: 2017).*

(Continued)

*Primary Examiner* — Jeffrey M Rutkowski
*Assistant Examiner* — Luna Weissberger
(74) *Attorney, Agent, or Firm* — Womble Bond Dickinson (US) LLP (57) ABSTRACT

The techniques described in this disclosure enhance the reception of the information at a user equipment (UE) from an Active Coordination Set (ACS) of a wireless network system, where the ACS includes a set of base stations that jointly operate to communicate data between the system and the UE. The ACS allocates respective subsets of a plurality of time domain resources for use by corresponding ACS base stations in communicating with the UE, and provides, to the UE, an indication of the allocations. Based on the received allocation indication (502), the UE obtains data payload transmitted by the ACS (508) by tuning to various base stations in accordance with their respective time domain resource allocations (505). The ACS may redun- (Continued)

dantly transmit selected data payload and/or employ different encoding schemes to further enhance reception of information at the UE.

18 Claims, 4 Drawing Sheets

(51) Int. Cl.
*H04B 7/06* (2006.01)
*H04W 72/044* (2023.01)

(56) References Cited

U.S. PATENT DOCUMENTS

| | | | |
|---|---|---|---|
| 9,706,505 B2 * | 7/2017 | Pietraski | H04W 52/325 |
| 2011/0103247 A1 | 5/2011 | Chen et al. | |
| 2013/0237231 A1 | 9/2013 | Nagaraja et al. | |
| 2013/0286960 A1 * | 10/2013 | Li | H04B 7/0684 370/329 |
| 2014/0307702 A1 | 10/2014 | Mese et al. | |
| 2015/0117360 A1 | 4/2015 | Shen et al. | |
| 2017/0238271 A1 * | 8/2017 | Viorel | H04B 7/024 370/350 |
| 2017/0265221 A1 | 9/2017 | Yang et al. | |
| 2018/0145732 A1 | 5/2018 | Shen et al. | |
| 2022/0095304 A1 * | 3/2022 | Muruganathan | H04W 72/0453 |

OTHER PUBLICATIONS

International Search Report and Written Opinion for Application No. PCT/US2020/018980, dated May 25, 2020.
Caict, "Discussion on URLLC Reliability/Robustness Enhancement with Multi-TRP/Panel," 3GPP Draft (2019).
European Office Action in related EP application 20712155.9 dated Jul. 12, 2024, pp. 1-7.
Notice of Decision to Grant in related Chinese application 202080027654.7 dated May 29, 2024, pp. 1-7.

* cited by examiner

ENHANCING PERFORMANCE OF DOWNLINKS BETWEEN USER EQUIPMENT AND ACTIVE COORDINATION SETS

CROSS-REFERENCE TO RELATED APPLICATIONS

This patent application is a national stage application, filed under 35 U.S.C. § 371, of International Application No. PCT/US2020/018980, filed Feb. 20, 2020 and entitled "Enhancing Performance of Downlinks Between User Equipment and Active Coordination Sets," which claims priority to and the benefit of U.S. Provisional Patent Application No. 62/808,048, filed Feb. 20, 2019 and entitled "Enhancing Performance of Downlinks Between User Equipment and Active Coordination Sets," the disclosures of which are incorporated by reference herein in their entireties.

BACKGROUND

An Active Coordination Set (ACS) of base stations within a wireless network system provides and optimizes mobility management and other services to a user equipment or device (UE). As a UE moves throughout the coverage provided by a wireless network system, the UE continually determines and updates, from its perspective, which base stations are presently or currently usable for wireless communications, and the UE continually informs an ACS server included in the wireless network system of its presently or currently suitable base stations, e.g., its candidate ACS base stations. Based on the candidate base stations, the ACS server determines the particular base stations that are included the ACS of the UE. The ACS server may provide an indication of the ACS of the UE (e.g., and of the base stations included in the ACS of the UE) to a master base station or controller, which in turn coordinates joint transmissions and/or receptions between the UE and the base stations of the ACS. Alternatively, the ACS server may coordinate the joint transmissions and/or receptions between the UE and the base stations of the ACS.

Generally speaking, the base stations included in the ACS of the UE are utilized in a flexible, coordinated, joint manner to deliver communications to and from the UE. That is, the ACS may operate as a logical, "super" base station of the wireless network system via which transmissions are sent to and received from the UE via one or more physical ACS base stations (and, in some scenarios, simultaneously and/or redundantly). Further, different base stations that are included in the ACS of the UE may utilize the same or different radio access technologies (RATs) in the same or different frequency bands to communicate with the UE, e.g., 4G, 4G LTE, 5G-NR, 6G, Wi-Fi, mmWave, 3.5 GHz, etc. Within the wireless network system, the ACS server administrates and maintains information indicative of the associations of UEs with their respective ACSs, the respective base stations that are currently included the respective ACSs of the UEs, and the changes to the sets of base stations included in the ACSs as UEs move through the coverage area of the wireless network system, as channel qualities change, and/or as other dynamic conditions occur.

At higher frequencies, such as in the 3.5 GHz and/or mmWave frequency bands, presently a UE is able to tune to only a single beam at a time. That is, at these higher frequencies, typically the UE is able to receive data via only one beam at any instance in time, e.g., as the UE typically has only a single antenna system that operates in these higher frequency bands. As such, a UE is not able to concurrently (e.g., over a single time interval) tune to and receive information via multiple beams that are generated by one or more base stations of its ACS, and thus the UE is not able to fully avail itself of the jointly coordinated transmissions from various base stations of the ACS. Consequently, downlink (DL) performance, and in particular, the fidelity and/or completeness of the contents or data payload of the wireless transmissions that are received at the UE from the ACS, may suffer.

SUMMARY

The systems, methods, and techniques described in this disclosure enhance the reception of the information at a user equipment (UE) from an Active Coordination Set (ACS) of a wireless network system. The ACS includes a set of base stations that are selected from a candidate set of base stations indicated by the UE and that cooperatively and/or jointly operate to communicate data to/from the UE. Generally speaking, the ACS may allocate, to each of one or more base stations of the ACS, a respective subset of a plurality of time domain resources for use in communicating with the UE. The ACS may provide, to the UE, an indication of the allocations of the subsets of time domain resources to respective ACS base stations. Accordingly, based on the indication of allocations, the UE obtains information or data payload that has been transmitted by the ACS by tuning to various base stations in accordance with their respective time domain resource allocations.

In an example embodiment, a method of enhancing reception of information at a user equipment (UE) from an Active Coordination Set (ACS) includes providing, by processing hardware of a wireless network system to the UE via one or more radio interfaces, first information indicative of (i) a first subset of time domain resources of a plurality of time domain resources allocated for use by a first base station of the ACS to deliver communications between the ACS and the UE, and (ii) a first set of spatial resources utilized by the first base station; and/or second information indicative of (i) a second subset of time domain resources of the plurality of time domain resources allocated for use by a second base station of the ACS to deliver communications between the ACS and the UE, and (ii) a second set of spatial resources utilized by the second base station. The method further includes transmitting, by the processing hardware via the one or more radio interfaces, data payload from the ACS to the UE via the first base station by utilizing the first subset of time domain resources and the first set of spatial domain resources and via the second base station by utilizing the second subset of time domain resources and the second set of spatial domain resources.

In an example embodiment, a method of enhancing reception of information at a user equipment (UE) from an Active Coordination Set (ACS) includes receiving, by processing hardware of the UE via one or more radio interfaces, first information indicative of (i) a first subset of time domain resources of a plurality of time domain resources allocated for use by a first base station of the ACS to deliver communications between the ACS and the UE, and (ii) a first set of spatial resources utilized by the first base station; and/or second information indicative of (i) a second subset of time domain resources of the plurality of time domain resources allocated for use by a second base station of the ACS to deliver communications between the ACS and the UE, and (ii) a second set of spatial resources utilized by the second base station. Additionally, the method includes tuning, by the processing hardware of the UE, to the first set of spatial resources during the first subset of time domain resources and to the second set of spatial resources during the second subset of time domain resources, and receiving, by the processing hardware of the UE via the tuning, data payload transmitted from the ACS.

DETAILED DESCRIPTION

The techniques described in this disclosure enhance the performance of downlinks (DL) between a User Equipment (UE) and its Active Coordination Set (ACS). In particular, the techniques described in this disclosure enhance the reception, fidelity, and/or completeness of data payload received at the UE from the ACS. The disclosed techniques allow a UE to receive information or data payload that an ACS transmits to the UE via multiple beams generated by the ACS, where a single ACS base station forms or multiple ACS base stations concurrently form the multiple beams over an interval of time. A coordination subsystem of the wireless network system coordinates the usage of time domain resources and/or payload distribution among the base stations of a current ACS of the UE to enhance reception of information at the UE.

Generally speaking, the coordination subsystem allocates a respective subset of a plurality of time domain resources included in an interval of time for respective utilization by base stations of the ACS. The coordination subsystem provides an indication of the time domain resource allocations (and optionally, of other associated air interface resources) that are respectively utilized by the base stations to the UE. Consequently, the UE tunes to various beams formed by various ACS base stations over time in accordance with the time domain resource allocations to receive data payload from the ACS. In an example, based on indicated allocated time domain resources and indicated spatial resources, the UE tunes to a first beam formed by a first ACS base station during a first set of time slots that has a first spatial geometry (e.g., direction, bandwidth, etc.), a second beam formed by a second ACS base station during a second set of time slots that has a second spatial geometry, and the first beam formed by the first ACS base station during third set of time slots, etc.

In an embodiment, the coordination subsystem allocates time domain resources to the ACS base stations in a mutually-exclusive manner. For example, the coordination subsystem may allocate time domain resources in a mutually-exclusive, repeating manner among the entire set of ACS base stations, e.g., to generate a beam-sweeping pattern across all of the base stations included in the ACS.

In an embodiment, the coordination subsystem determines and indicates to the UE that one or more portions of the content or data payload are to be redundantly transmitted by multiple base stations of the ACS to the UE. For example, the coordination subsystem may determine and indicate to the UE that a particular portion of the content or data payload is to be redundantly delivered to the UE via multiple beams that are respectively formed by multiple ACS base stations. In some implementations, the multiple ACS base stations respectively form the multiple beams via which the redundant payload is delivered from the ACS to the UE by utilizing one or more common time domain resources so that, from the perspective of the UE, multiple beams are associated with the one or more common time domain resources, and data payload may be concurrently received via the multiple beams via those common time domain resources. The coordination subsystem provides an indication of the redundancy scheme to the UE, e.g., via a control channel. In some implementations, a particular portion of data payload is redundantly transmitted from the ACS to the UE in a sequential manner, e.g., in an initial transmission and in a re-transmission. The ACS may send the retransmission to the UE via the same ACS base station that sent the initial transmission, or the ACS may send the retransmission to the UE via a different ACS base station.

In an embodiment, the UE includes multiple, steerable receive antenna systems. In this embodiment, the UE receives or tunes to multiple beams from multiple ACS base stations, e.g., simultaneously over some interval of time. Multiple ACS base stations may have formed the multiple beams that are received at or tuned to by the UE by using common and/or mutually-exclusive time domain resources, for example. The data payload that is delivered to the UE via the multiple beams may or may not include redundant portions of the data payload.

Accordingly, by utilizing one or more of the disclosed techniques, the coordination subsystem enhances the reception, at the UE, of data payload transmitted by multiple ACS base stations, thus providing increased fidelity of the data payload received at the UE.

Figure 1:
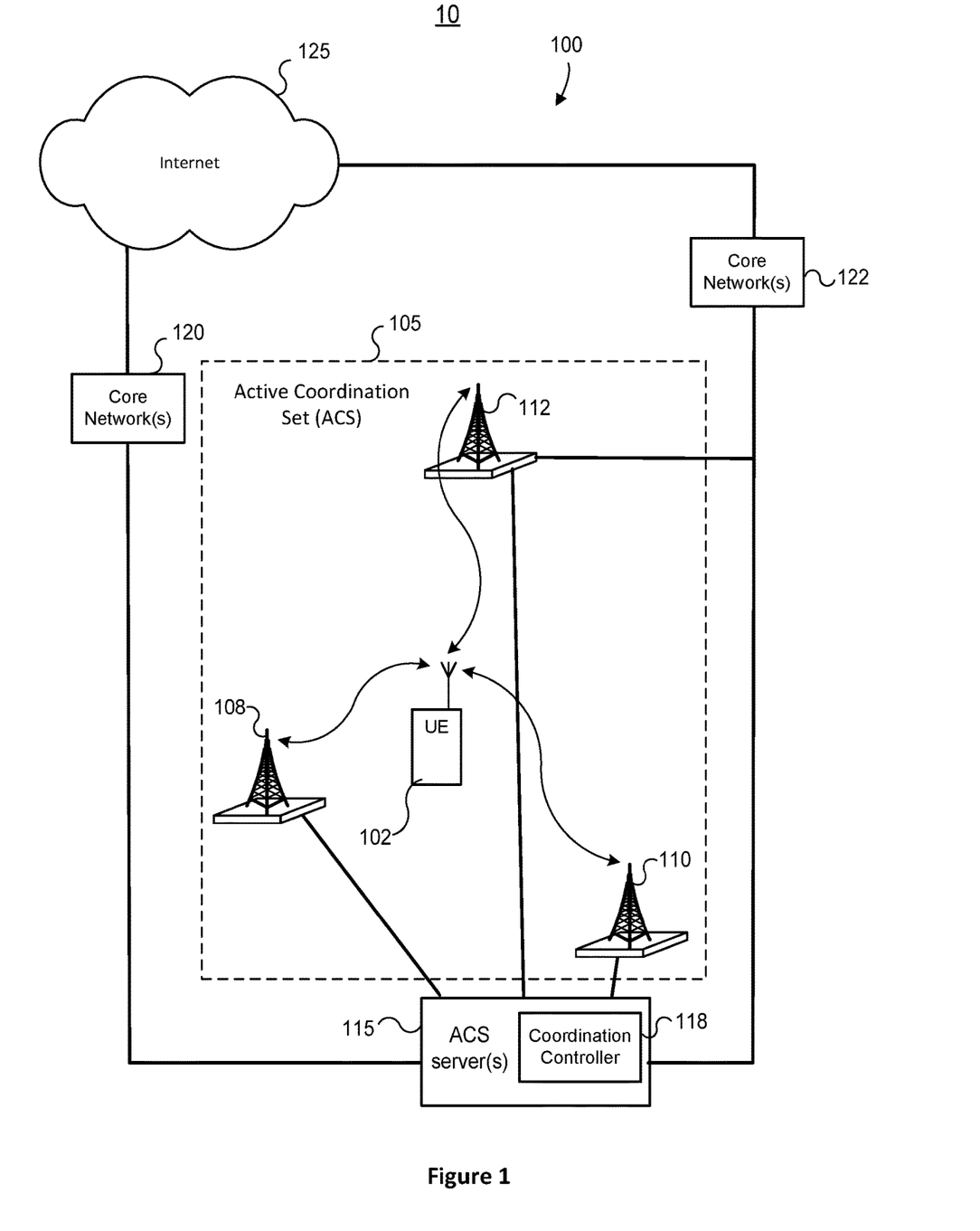
FIG. 1 illustrates an example wireless environment in which a wireless network system communicates with a user equipment (UE) via an Active Coordination Set of base stations to enhance UE reception.

FIG. 1 illustrates an example wireless environment 10 in which a wireless network system 100 communicates with a user equipment (UE) 102 via an Active Coordination Set (ACS) 105 of base stations 108, 110, and 112. Each of the base stations 108, 110, 112 included in the Active Coordination Set 105 operates in accordance with one or more different Radio Access Technologies (RATs), which may be operable within same and/or different frequency bands. For example, each base station of the ACS may include components that operate in accordance with 4G, 4G-LTE, 5G-NR, 6G, Wi-Fi, IEEE 802.11-compatible wireless standard, IEEE 802.16-compatible wireless standard, mmWave, 3.5 GHz, and/or other Radio Interface Technologies. Of course, although FIG. 1 illustrates only three base stations 108, 110, 112 as being included in the ACS 105 of the UE 102, this is for ease of illustration only, and is non-limiting. Generally speaking, an ACS 105 that services a UE 102 may include any number of one or more base stations of the wireless network system 100.

One or more ACS servers 115 administrates and manages the ACS 105 of the UE 102 and other ACSs corresponding to other UEs within the wireless network system 100. The system 100 may include any number of one or more ACS servers 115 (which may cooperatively operate as a single, logical ACS server, and/or may separately operate as different, distinct ACS servers, e.g., each of which may service a different geographical region, a different number of UEs, etc.). For ease of reading and not limitation purposes, though, the present disclosure refers to the one or more ACS servers 115 in the singular tense, i.e., "the ACS server 115".

To illustrate the administration and management of ACSs, and referring to the UE 102 as an example, the UE 102 determines a set of candidate base stations of the wireless network system 100 that are suitable to service the UE 102 (e.g., based on link quality measurements and/or sounding signals), and informs the ACS server 115 of the set of candidate base stations (e.g., via a control channel). The UE 102 continually updates the candidate set of base stations and informs the ACS server 115 accordingly as the UE 102 moves through the coverage area of the wireless network system 100, as channel conditions change, and/or as other dynamic conditions occur.

The ACS server 115 receives the set of candidate base stations from the UE 102 and determines the particular set of one or more base stations 108, 110, 112 that are included in the ACS 105 of the UE 102. The ACS server 115 may determine that the ACS 105 includes all of the candidate base stations, or the ACS server 115 may determine that the ACS 105 includes a subset of the candidate base stations. At any rate, the ACS server 115 determines the particular base stations that are included in the ACS 105 based on any number of factors such as, for example, channel quality, base station loading and/or other performance measurements, base station and/or base station equipment and/or component status, direction of travel of the UE 102, etc. The ACS server 115 indicates the ACS 105 (e.g., the identities of the particular set of base stations included in the ACS 105) to a master base station that coordinates data traffic transmissions to and receptions from the UE 102 on behalf of the ACS 105. The master base station may be a designated one of the base stations of the ACS 105, for example. Alternatively, the ACS server 115 indicates the ACS 105 (e.g., the identities of the particular set of base stations included in the ACS 105) to a coordination controller or subsystem 118 that coordinates data traffic transmissions to and receptions from the UE 102 on behalf of the ACS 105. The coordination controller 118 may be a centralized coordination controller that is included or implemented in the ACS server 115, as depicted in FIG. 1. Alternatively, in some embodiments (not shown), one or more ACS base stations implements the coordination controller 118. For example, more than one ACS base station may communicate with each other in a peer-to-peer manner to cooperatively or jointly implement the coordination controller 118 for the system 100.

In another example, the coordination controller 118 is centrally disposed within the network 100 but separate from the ACS server 115 and from any ACS base station. For ease of reading and not for limitation purposes, the present disclosure refers to a centralized coordination controller 118 of the ACS 105; however, the techniques associated with the centralized coordination controller 118 are easily and equally applicable to a master base station of the ACS 105 and/or to a coordination controller or subsystem that is implemented in a distributed manner within the system 100.

In an example of coordinating data traffic transmissions between the ACS 105 and the UE 102, the centralized coordination controller 118 decides which one or more ACS base stations are to provide the uplink from the UE 102 and which one or more ACS base stations are to provide the downlink to the UE 102, and instructs or informs the base stations of the ACS 105 (and optionally, the UE 102) accordingly. Additionally or alternatively, the centralized coordination controller 118 may decide which one or more ACS base stations are to provide the signaling link between the UE 102 and the ACS 105 and which one or more ACS base stations are to provide data links between the UE 102 and the ACS 105, and may instruct or inform the base stations of the ACS 105 (and optionally, the UE 102) accordingly. Further additionally or alternatively, the centralized coordination controller 118 may provide and cause implementation of other types of coordination and utilization of communication resources among the base stations of the ACS 105, such as how an established session between the UE 102 and the ACS 105 is to be handed-off between various physical base stations of the ACS 105, etc. Still further additionally or alternatively, the centralized coordination controller 118 may cause various data payload to be redundantly transmitted to the UE 102 via multiple ACS base stations. Generally speaking, as the ACS 105 is logically viewed as a "super-base station," the centralized coordination controller of subsystem 118 may be logically viewed as the "super-base station controller."

As illustrated in FIG. 1, each of the base stations 108, 110, 112 is operable using one or more RATs (e.g., 4G-LTE, 5G-NR, 6G, etc.) that link to core networks 120, 122 which, in turn, communicatively connect to the Internet 125. As also illustrated in FIG. 1, data traffic flows between the base stations 108, 110, 112 and the core networks 120, 122 via the ACS server 115. In other embodiments (not shown in FIG. 1), at least some of the data traffic flows directly between base stations 108, 110, 112 and corresponding core networks 120, 122. Additionally or alternatively, in some embodiments (also not shown in FIG. 1), one or more ACS base stations are operable using RATs (e.g., Wi-Fi, 4G, etc.) that do not link to any core networks 108, 110, but that are nonetheless communicatively connected with the Internet 125 via one or more other suitable types of ground network communication systems.

Although not illustrated in FIG. 1, each of the base stations 108, 110, 112 includes respective processing hardware that can include one or more general-purpose processors (e.g., CPUs) and a non-transitory computer-readable memory storing instructions that the one or more general-purpose processors execute. Additionally or alternatively, the respective processing hardware of each base station 108, 110, 112 may include special-purpose processing units such as one or more respective wireless communication chipsets and one or more respective radio resource controllers (RRCs), for example, that are particularly configured to support communications of the respective base station 108, 110, 112 in accordance with one or more RATs. Each of the RRC controllers of each base station 108, 110, 112 may be implemented using any suitable combination of hardware, software, and firmware. In one example implementation, the RRC controller is a set of instructions that define a component of the operating system of its respective base station 108, 110, 112, and one or more respective CPUs execute these instructions to perform RRC functions. In another example implementation, the RRC controller is implemented using firmware that is as a part of a wireless communication chipset. In some implementations in which a base station 108, 110, 112 is able to communicate via more than one different RAT, the base station 108, 110, 112 may include a specific wireless communication chipset and a specific RRC corresponding to each different RAT, or the base station 108, 110, 112 may include a single wireless communication chipset and a single RRC that are configured to support more than one different RATs.

Similarly, although not illustrated in FIG. 1, the UE 102 includes respective processing hardware that can include one or more general-purpose processors (e.g., CPUs) and a non-transitory computer-readable memory storing instructions that the one or more general-purpose processors execute. Additionally or alternatively, the respective processing hardware of the UE 102 may include special-purpose processing units such as one or more respective wireless communication chipsets and one or more respective radio resource controllers (RRCs), for example, that are particularly configured to support communications of the UE 102 in accordance with one or more RATs. Each of the RRC controllers of the UE 102 may be implemented using any suitable combination of hardware, software, and firmware. In one example implementation, the RRC controller is a set of instructions that define a component of the operating system of the UE 102, and one or more respective CPUs execute these instructions to perform RRC functions. In another example implementation, the RRC controller is implemented using firmware that is as a part of a wireless communication chipset. In some implementations in which the UE 102 is able to communicate via more than one different RAT, the UE 102 may include a specific wireless communication chipset and a specific RRC corresponding to each different RAT, or the UE 102 may include a single wireless communication chipset and a single RRC that are configured to support more than one different RATs. In some embodiments, the UE 102 includes only a single antenna system that supports each type of on-board RAT. In some embodiments, the UE 102 includes more than one, separate antenna system that supports a single type of RAT. In an example, the UE 102 includes two separately tunable antenna systems, each of which supports 5G-NR, e.g., so that two separate data streams may be simultaneously delivered to/from the UE 102 in accordance with 5G-NR. In some embodiments, the UE 102 includes a single antenna system that supports multiple types of RAT. For example, the UE 102 may include a single antenna system that supports both 5G-NR and 6G.

As illustrated in FIG. 1, the ACS base stations 108, 110, 112 may utilize a same or common set of frequency domain resources, a same or common set of time domain resources, and optionally a same or common set of spatial domain resources via which data may be delivered from the ACS 105 to the UE 102. For example, each of the ACS base stations 108, 110, 112 includes respective processing hardware to form transmit beams in accordance with 5G RAT and/or with 6G RAT. To enhance the downlink performance and, in particular, to enhance reception, fidelity, and/or completeness of data payload at the UE 102, the coordination controller 118 allocates a respective subset of a plurality or pool of time domain resources that are included in an interval of time for utilization by each base station 108, 110, 112 of the ACS 105. The plurality or pool of time domain resources may be, for example, a plurality or pool of time slots or a plurality or pool of time-frequency slots.

The coordination controller 118 provides an indication of the time domain resource allocations (and optionally, of other associated air interface resources such as spatial resources or spatial domain resources) that are respectively utilized by the base stations to the UE 102, thus causing the UE 102 to tune, over time in accordance with the time domain resource allocations and other associated air interface resources, to various beams formed by various ACS base stations 108, 110, 112. In an example scenario, based on indicated allocated time domain resources and spatial resources indicated by the coordination controller 118, the UE 102 tunes to a first beam formed by a ACS base station 108 during a first set of time slots, a second beam formed by ACS base station 110 during a second set of time slots, the first beam formed by the ACS base station 108 during third set of time slots, and a third beam formed by the ACS base station 112 during a fourth set of time slots, etc. The coordination controller 118 may provide the indication of the time domain resource allocations and (and optionally, or the other associated air interface resources such as spatial resources or spatial domain resources) by utilizing any suitable communication mechanism.

In an example, the coordination controller 118 provides said indications to the UE 102 via pilot signals generated by the ACS base stations. Each ACS base station generates a respective pilot signal in accordance with its allocated time domain resources, and the UE 102 determines the allocations based on the received pilot signals.

In another example, the coordination controller 118 provides said indications to the UE 102 via a control channel of the ACS 105, where the ACS control channel may be implemented by a single ACS base station or may be cooperatively implemented via multiple ACS base stations. The indications of the allocated time domain resources (and optionally other air interface resources) may be of any suitable format. For example, in an embodiment, the coordination controller 118 communicates, to the UE 102, respective schedules via which respective ACS base stations are to communicate. In an embodiment, the coordination controller 118 communicates, to the UE 102, respective schedules and respective spatial resources via which respective ACS base stations are to communicate. In an embodiment, each beam that is formable by each ACS base station is uniquely identified by a respective beam identifier, and the coordination controller 118 communicates beam identifiers corresponding to the allocated time domain resources to the UE 102. Of course, the centralized controller 118 may additionally or alternatively utilize other mechanisms to communicate time domain resource allocations to the UE 102.

Figure 2:
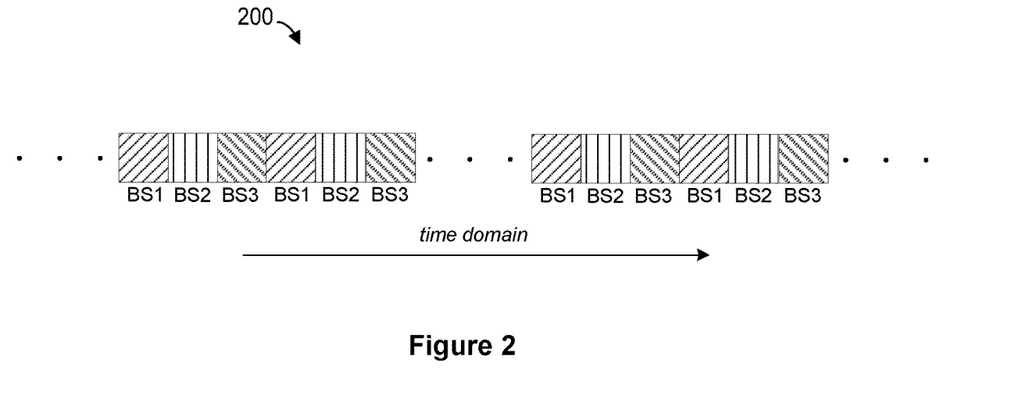
FIG. 2 illustrates an example allocation of time domain resources among base stations included in an Active Coordination Set.

FIG. 2 illustrates an example time domain resource allocation 200 and, for clarity of discussion and not limitation purposes, is discussed in conjunction with FIG. 1. In the example allocation 200, an ACS includes three different base stations (i.e., BS1, BS2, BS3), and the coordination controller (e.g., the coordination controller 118) allocates a pool of time slots for each of the base stations' respective use in a cyclical, repeating pattern. Essentially, in FIG. 2, the pool of time slots are allocated among the base stations BS1, BS2, BS3 of the ACS in a round-robin or beam-sweeping manner. The centralized controller 118 indicates this resource allocation 200 to the UE 102, and the UE 102 tunes to each base station BS1, BS2, BS3 during the time slots that have been allocated to each base station BS1, BS2, BS3. In an embodiment, the centralized controller 118 also indicates, to the UE, respective, particular spatial resources that are to be utilized by a respective base station during each time slot so that the UE 102 is able to tune to and receive a respective beam formed by the respective base station utilizing the indicated time domain and spatial resources.

Figure 3:
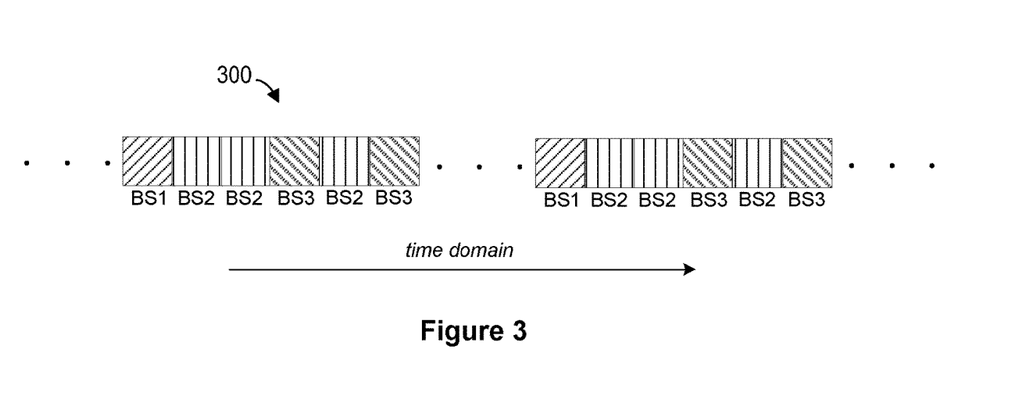
FIG. 3 illustrates another example allocation of time domain resources among base stations included in an Active Coordination Set.

The allocation of time domain resources need not, however, be uniformly distributed among all base stations of an ACS. FIG. 3 illustrates another example time domain resource allocation 300 and, for clarity of discussion and not limitation purposes, is discussed in conjunction with FIG. 1. In this example allocation 300, an ACS includes three different base stations (i.e., BS1, BS2, BS3). BS2 is allocated three times as many time slots for its use as compared to the time slots allocated for BS1, and BS3 is allocated twice as many time slots for its use as compared to the time slots allocated for BS1. Note that in spite of the non-uniform allocation 300 among base stations BS1, BS2, BS3, the time slots are nonetheless allocated in a repeating pattern.

The two example time domain resource allocations 200, 300, though, are merely example allocations. Indeed, the centralized coordination controller 118 may allocate a pool of time domain resources uniformly or non-uniformly among some or all of the base stations of an ACS. Additionally or alternatively, the centralized coordination controller 118 may allocate the pool of time domain resources in a repeating pattern, a partially-repeating pattern, or without any pattern at all. In some implementations, the centralized coordination controller 118 allocates at least some of the available time domain resources among the base stations of an ACS based on one or more criteria, such as channel quality, base station load, availability and/or fidelity of hardware and/or software resources at each base station, demand, and the like. In some implementations, the centralized coordination controller 118 allocates at least some of the available time domain resources randomly among the ACS base stations.

Returning now to FIG. 1, to enhance downlink performance and, in particular, enhance the reception, fidelity, and/or completeness of data payload at the UE 102, in some embodiments, the centralized coordination controller 118 coordinates a redundant delivery of a portion of data payload from the ACS 105 to the UE 102. In an example scenario, the centralized coordination controller 118 coordinates the ACS 105 to simultaneously and redundantly transmit (e.g., transmit over a same set of time domain resources) a particular data payload via two different base stations 108, 110. Each of the base stations 108, 110 forms a respective beam by utilizing a same set of time domain resources (or by utilizing respective sets of time domain resources, each of which includes at least one common time domain resource) and different sets of spatial resources, and the particular data payload may be transmitted from the ACS 105 to the UE 102 via the respective beams formed by the base stations 108, 110. Such simultaneous, redundant transmission of data payload via multiple ACS base stations may increase the energy gain at the UE 102, and accordingly may increase the fidelity of the data payload received at the UE 102.

In another example scenario, the centralized coordination controller 118 coordinates a redundant delivery of a particular data payload DP from the ACS 105 to the UE 102 in a sequential manner over time, which is referred to as "incremental redundancy" or "sequential redundancy." For example, a first ACS base station 108 initially transmits a particular data payload from the ACS 105 to the UE 102 by utilizing a first set of time domain resources. Subsequently, at a later moment in time and by utilizing a different set of time domain resources, the first ACS base station 108 or a second ACS base station 110 re-transmits the particular data payload from the ACS 105 to the UE 102. The ACS 105 may initiate the re-transmission of the particular data payload, for example, based on a detected insufficient channel quality (e.g., of a particular ACS base station, and/or of a cumulative or accumulated channel quality of the entire ACS 105) and/or based on some other error condition corresponding to the initial transmission.

Indeed, the centralized controller 118 may direct the ACS 105 to utilize various different redundancy schemes or strategies in various scenarios, and may indicate a selected redundancy scheme to the UE 102, e.g., via the control channel of the ACS 105. A particular redundancy scheme may be a default redundancy scheme, and such need not be communicated explicitly to the UE 102. For example, as a default redundancy scheme, each base station 108, 110, 112 of the ACS 105 redundantly transmits data payload to the UE 102 via a respective beam formed by utilizing its respective, allocated time slots or time-frequency slots, and the UE 102 recovers the data payload from one or more beams formed by the base stations 108, 110, 112. As such, if one particular beam is subject to interference or blocking, the UE 102 still is able to recover the data payload from other beams generated by the ACS 105. Of course, the ACS 105 may select and communicate other redundancy schemes may to the UE 102, such as redundant, simultaneous transmissions via a subset of ACS base stations, incremental redundancy of particular data payload via one or more ACS base stations, etc.

Thus, in view of the present disclosure, as the ACS 105 redundantly (and in some situations, simultaneously over a time interval) transmits data payload to the UE 102 via multiple ACS base stations in accordance with the indicated time domain resource allocations and redundancy schemes, and as the UE 102 tunes to multiple beams formed by the multiple ACS base stations in accordance with the indicated time domain resource allocations, and recovers data payload transmitted via the multiple beams in accordance with the indicated redundancy schemes, the reception, fidelity, and completeness of the data payload that is received at the UE 102 from the ACS 105 is enhanced. The dynamically flexible coordination of time domain resource allocation and redundancy schemes within the ACS 105 allow the system 100 to mitigate dynamic, varying interference and/or blocking conditions, and/or other conditions that may adversely affect downlink performance. Accordingly, the UE 102 is able to obtain data payload transmitted by the ACS 105 in an accurate and timely manner.

Figure 4:
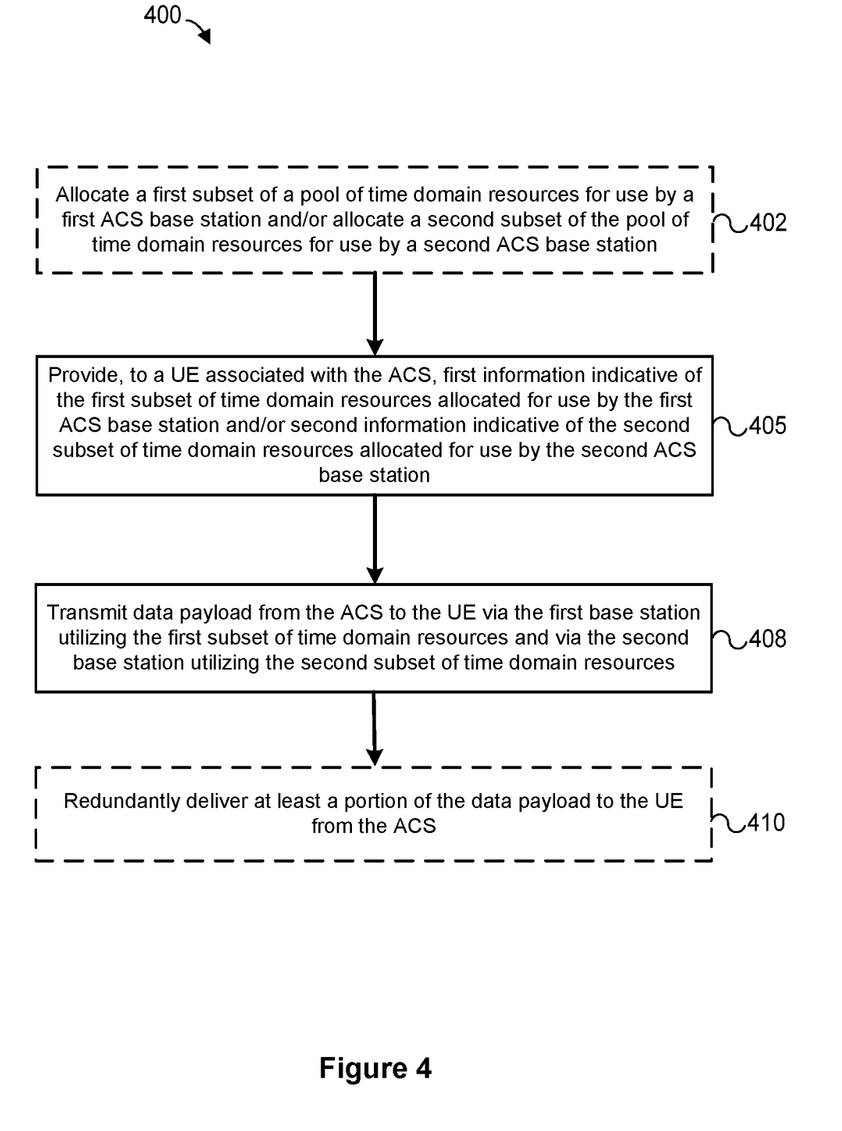
FIG. 4 is a flow diagram of an example method of enhancing the reception of information at a user equipment (UE) from an Active Coordination Set (ACS).

FIG. 4 is a flow diagram of an example method 400 of enhancing reception of information at a user equipment (UE) from an Active Coordination Set (ACS). In an embodiment, the wireless network system 100 (e.g., processing hardware of the wireless network system 100) performs at least a portion of the method 400. Additionally or alternatively, other suitable wireless systems may perform at least a portion of the method 400. In embodiments, the method 400 may include additional, less, or alternate functionality than that discussed with respect to FIG. 4, including that discussed elsewhere in this document.

At a block 405, the method 400 includes providing, to a User Equipment (UE) via one or more radio interfaces, at least one of: (1) first information indicative of a first subset of a pool or plurality of time domain resources that are allocated for use by a first base station of an Active Coordination Set (ACS) e.g., to deliver communications between the ACS and the UE, or (ii) second information indicative of a second subset of the pool or plurality of time domain resources that are allocated for use by a second base station of the ACS, e.g., to deliver communications between the ACS and the UE. As previously discussed, an ACS of a UE is a set of base stations via which the wireless network system communicates with a UE, where the set of ACS base stations cooperatively and jointly operates as a logical, super base station via which the system wirelessly transmits data towards the UE and wirelessly receives data transmitted by the UE. The particular base stations included in the ACS of the UE are selected from a set of suitable candidate base stations that have been indicated to the wireless network system by the UE. Further, the particular base stations included in the ACS of the UE may dynamically change over time as the UE moves throughout the coverage area of the wireless network system and/or as channel conditions change.

In some embodiments, at the block 405, the method 400 includes providing, to the UE, both the first information indicative of the first subset of the plurality of time domain resources allocated to the first ACS base station and the second information indicative of the second subset of the plurality of time domain resources allocated to the second ACS base station.

In some embodiments, at the block 405, the method 400 includes providing, to the UE, indications of spatial resources that are respectively utilized by ACS base stations in conjunction with the indications of their allocated time domain resources. For example, the method 400 may include providing an indication of a first set of spatial domain resources utilized by the first ACS base station in conjunction with the first information indicative of the allocated first subset of time domain resources, and/or providing an indication of a second set of spatial domain resources utilized by the second ACS base station in conjunction with the second information indicative of the allocated second subset of time domain resources.

In some implementations, the processing hardware of the wireless network system provides the first information to the UE and/or the second information to the UE via pilot signals of ACS base stations, in an implementation. For example, a pilot signal generated by the first ACS base station may include the first information (or an indication of the first information), and/or a pilot signal generated by the second ACS base station may include the second information (or an indication of the second information). As such, upon the UE listening to the pilot signals generated by the ACS base stations, the UE is able to obtain the first information and/or the second information indicative of allocated time domain resources.

In some implementations, the processing hardware of the wireless network system provides the first information to the UE and/or the second information to the UE via a control or signaling channel of the ACS. A single ACS base station may implement the control/signaling channel on behalf of the ACS, or multiple ACS base stations may cooperatively and jointly operate to implement or form the control/signaling channel of the ACS.

At a block 408, the method 400 includes transmitting, via the one or more radio interfaces, data payload from the ACS to the UE via the first ACS base station using the first subset of time domain resources and a first set of spatial resources and via the ACS second base station utilizing the second subset of time domain resources and a second set of spatial resources.

In an embodiment, the first ACS base station forms a first beam using the first subset of time domain resources and the first set of spatial resources, and the second ACS base station forms a second beam using the second subset of time domain resources and the second set of spatial resources. In this embodiment, at the block 408, the method 400 includes transmitting the data payload from the ACS to the UE via the first beam formed by the first ACS base station and via the second beam formed by the second ACS base station. Each beam formed by base stations of the ACS may be uniquely identified (e.g., within the ACS and/or within the wireless network system) by a respective beam identifier. As such, providing the first information and the second information to the UE (block 405) may include providing the unique identifier of the first beam and the unique identifier of the second beam to the UE.

In an embodiment, at the block 405 of the method 400, providing the first information to the UE includes providing, to the UE, a first schedule via which the first ACS base station is configured to communicate. The first schedule may include indications of time domain resources allocated to the first ACS base station and optionally other resources utilized by the first ACS base station, such as frequency domain resources and/or spatial domain resources. Additionally or alternatively, providing the second information to the UE includes providing, to the UE, a second schedule via which the second ACS base station is configured to communicate. The second schedule may include indications of time domain resources allocated to the second ACS base station and optionally other resources utilized by the second ACS base station, such as frequency domain resources and/or spatial domain resources. Accordingly, in this embodiment, transmitting the data payload from the ACS to the UE via the first ACS base station using the first subset of time domain resources and via the ACS second base station utilizing the second subset of time domain resources (block 405) includes transmitting the data payload from the ACS to the UE in accordance with the first schedule and the second schedule.

In an embodiment, and as shown in FIG. 4, at an optional block 402 the method 400 includes allocating the first subset of time domain resources for use by the first ACS base station and allocating the second subset of time domain resources for use by the second ACS base station. In an embodiment, at the block 402 the method 400 may include allocating the first and the second subset of time domain resources in a round-robin manner, so that sequentially-occurring individual and/or groups of time domain resources are respectively and sequentially allocated to each of the base stations of the ACS. In an embodiment, 402 the method 400 may include allocating the first and/or the second subset of time domain resources based on respective loads and/or other performance criteria of one or more base stations of the ACS. For example, at the block 402 the method 400 may include allocating a fewer number of time domain resources to a more heavily loaded ACS base station and allocating a greater number of time domain resources to a less heavily loaded ACS base station.

Generally speaking, at the block 402, the allocations of the first and the second subset of time domain resources, respectively, for use by the first and the second ACS base stations may include any number and/or types of allocation schemes. For example, the allocations of the first and the second subset of time domain resources, respectively, for use by the first and the second ACS base stations may occur over time in a pattern, or the allocations may be at least partially random. The allocated first and the second subsets of time domain resources share or otherwise respectively include at least one common or same time domain resource, in an implementation. In other implementations, the allocations of the first and the second subsets of time domain resources are mutually exclusive.

In an embodiment, when the base stations included in the ACS of the UE change, e.g., due to movement of the UE, changes in channel quality, interference, etc., the method 400 may include reallocating and/or newly allocating respective subsets of time domain resources for use by one or more of the base stations included in the updated ACS, and providing the UE with an indication of the reallocations/new allocations.

In some embodiments, and as illustrated in FIG. 4, at an optional block 410 the method 400 redundantly delivering at least a portion of the data payload to the UE from the ACS. In some implementations, the blocks 408 and 410 are integral blocks, however, in the blocks 408 and 410 are illustrated in FIG. 4 as separate blocks and are described separately within this disclosure for clarity of discussion.

In an embodiment, at the block 410, redundantly delivering at least a portion of the data payload from the ACS to the UE includes delivering a same portion of the data payload both via a first beam formed by the ACS and via a second beam formed by the ACS. Indeed, in some embodiments, a same portion of the data payload is delivered from the ACS to the UE via a respective beam formed by each base station included in the ACS. In some implementations, more than one ACS base station form at least some of the beams via which the redundant payload is delivered by respectively utilizing at least some common or same time domain resources. Accordingly, when multiple beams formed by the ACS share a same subset of time domain resources, the ACS simultaneously or concurrently redundantly delivers a same portion of the data payload to the UE over an interval of time corresponding to the shared subset of time domain resources.

In an embodiment, at the block 410, redundantly delivering at least a portion of the data payload from the ACS to the UE includes transmitting a particular portion of the data payload via a first beam formed by the ACS, and then subsequently retransmitting the same, particular portion of the data payload via the first beam or via a second beam formed by the ACS, e.g., incremental or sequential redundancy. The processing hardware of the wireless network system may initiate the subsequent retransmission of the particular portion of the data payload based on various detected conditions, such as based on a quality of the channel corresponding to the first beam, a quality of a channel corresponding to the first ACS base station, a cumulative or accumulated channel quality of the ACS as a whole, and/or other channel quality conditions. Additionally or alternatively, the processing hardware the wireless network system initiate subsequent retransmission of the particular portion of the data payload based on other types of conditions, such as a lack of acknowledgement to the initial transmission, packet loss, component failure, etc.

In an embodiment, at the block 410, the method 400 includes providing an indication of the redundancy scheme to the UE. In an example, the ACS provides an indication of the redundancy scheme to the UE via a control channel of the ACS. The indication of the redundancy scheme may indicate, for example, a simultaneous or concurrent redundancy over an interval of time, a subsequent or incremental redundancy, which ACS base stations are involved in the redundancy scheme, etc. Over time, as the redundancy scheme changes, the ACS may provide updates to the redundancy schemes that are being employed. The ACS may transmit various portions of a data stream to the UE with or without redundancy. In situations in which redundancy is employed, the ACA may utilize one or more redundancy schemes. In an example, the ACS redundantly transmits first portion of the data stream to the UE in a concurrent manner, transmits a second portion of the data stream to the UE without any redundancy, and redundantly transmits a third portion of the data stream in an incremental manner.

In some implementations (not shown in FIG. 4), the method 400 includes delivering various portions of data payload from the ACS to the UE by utilizing different encoding schemes. For example, the wireless network system may distribute a plurality of modulation coding schemes to each base station, and consequently each base station included in the ACS is capable of encoding data streams using any of the distributed modulation coding schemes.

Similarly, the UE includes one or more decoders capable of decoding the plurality of modulation coding schemes. As such, transmitting the data payload from the ACS to the UE (block 408) may include encoding a first portion of the data payload by using a first modulation coding scheme and encoding a retransmission of the first portion of the data payload or a second portion of the data payload by using a second modulation coding scheme. The same ACS base station or different ACS base stations may transmit the differently encoded portions of data payload. The ACS may provide an indication of utilized modulation coding schemes to the UE via a control channel of the ACS.

Figure 5:
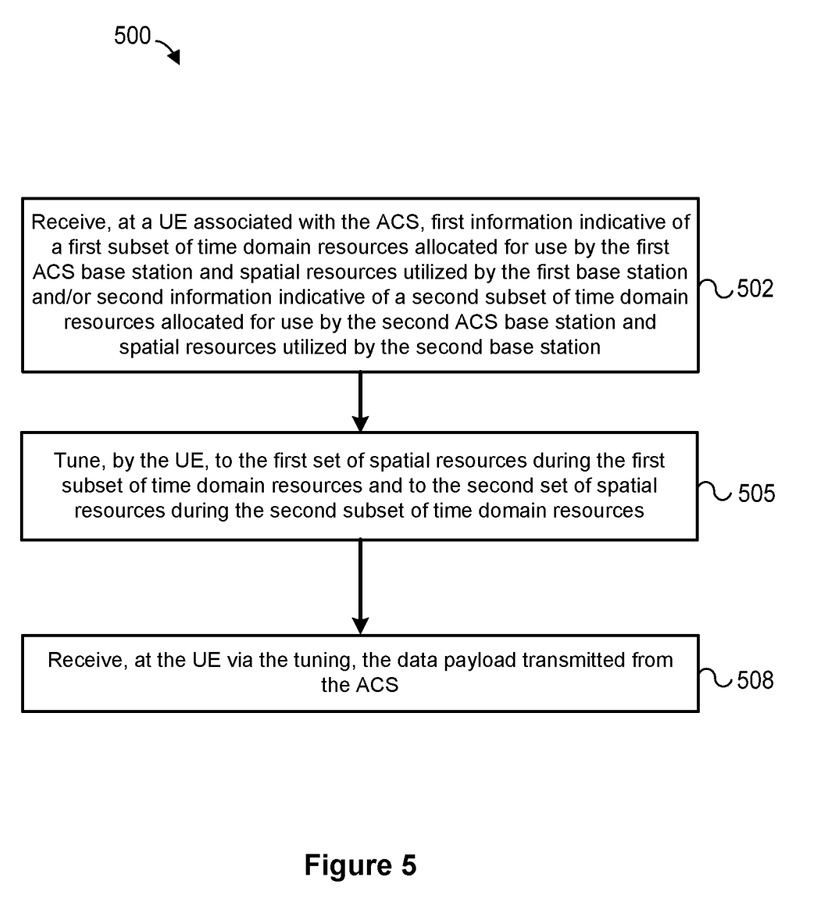
FIG. 5 is a flow diagram of an example method of enhancing the reception of information at a user equipment (UE) from an Active Coordination Set (ACS).

FIG. 5 is a flow diagram of an example method 500 of enhancing reception of information at a user equipment (UE) from an Active Coordination Set (ACS). In an embodiment, the UE 102 (e.g., processing hardware of the UE 102) performs at least a portion of the method 500. In embodiments, the method 500 may operate in conjunction with one or more portions of the method 400. In embodiments, the method 500 may include additional, less, or alternate functionality than that discussed with respect to FIG. 5, including that discussed elsewhere in this document.

At a block 502, the method 500 includes receiving, at a UE associated with an ACS, first information indicative of a first subset of time domain resources that are allocated for use by a first base station included in the ACS and/or second information indicative of a second subset of time domain resources that are allocated for use by a second base station included in the ACS. For example, an ACS may transmit the first information and/or the second information via pilot signals and/or a control channel of the ACS, and the UE may obtain the transmitted first and/or second information from the pilot signals and/or the control channel of the ACS. In some embodiments, the UE receives both the first information and the second information. In some embodiments, the UE receives only one of the first information or the second information, and determines the time domain resource allocations corresponding to other ACS base stations based on the received information. At any rate, the first information and/or the second information that is received by the UE may be of any suitable format, such as schedules, beam identifiers, etc.

In some embodiments, at the block 502, the method 500 includes receiving, at the UE, indications of spatial resources that are respectively utilized by ACS base stations in conjunction with the indications of their allocated time domain resources. For example, the method 500 may include receiving an indication of a first set of spatial domain resources utilized by the first ACS base station in conjunction with the first information indicative of the allocated first subset of time domain resources, and/or receiving an indication of a second set of spatial domain resources utilized by the second ACS base station in conjunction with the second information indicative of the allocated second subset of time domain resources.

At a block 505, the method 500 includes tuning, by the UE, to the first set of spatial resources during the first subset of time domain resources and tuning to the second set of spatial resources during the second subset of time domain resources. For example, if the first information and/or the second information indicates a patterned allocation, at the block 505 the UE tunes to respective time domain resources in accordance with the patterned allocation. In an embodiment, at the block 505, the method 500 includes tuning to a first beam formed by utilizing the first set of spatial resources and the first subset of time domain resources, and tuning, by the UE, to a second beam formed by utilizing the second set of spatial resources and the second subset of time domain resources.

At a block 508, the method 500 includes receiving or obtaining, at the UE via the tuning, data payload transmitted from the ACS. In embodiments, the UE redundantly receives the data payload, e.g., sequentially or concurrently over some interval of time in accordance with one or more redundancy schemes, such as in a manner similar to that discussed above. In embodiments, obtaining the data payload at the UE includes respectively decoding portions of the data payload in accordance with different modulation schemes, such as in a manner similar to that discussed above. The UE may receive, from the ACS, indications of the redundancy schemes and/or the modulation coding schemes utilized by the ACS, e.g., via a control channel of the ACS.

The following additional considerations apply to the foregoing discussion.

A user device or User Equipment in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for enhancing reception of information at a user equipment from an Active Coordination Set through the principles disclosed. Thus, while particular embodiments and applications have been illustrated and described, the disclosed embodiments are not limited to the precise construction and components disclosed. Various modifications, changes and variations, which will be apparent to those of ordinary skill in the art, may be made in the disclosed arrangement, operation, and details of the method and apparatus without departing from the spirit and scope defined in the appended claims.

The following list of aspects reflects a variety of the embodiments explicitly contemplated by the present disclosure Aspect 1. A method of enhancing reception of information at a UE from ACS, the ACS including a plurality of base stations, comprises providing, by processing hardware of a wireless network system to the UE via one or more radio interfaces, at least one of: first information indicative of (i) a first subset of time domain resources of a plurality of time domain resources allocated for use by a first base station of the ACS to deliver communications between the ACS and the UE, and (ii) a first set of spatial resources utilized by the first base station; or second information indicative of (i) a second subset of M time domain resources of the plurality of time domain resources allocated for use by a second base station of the ACS to deliver communications between the ACS and the UE, and (ii) a second set of spatial resources utilized by the second base station; and transmitting, by the processing hardware via the one or more radio interfaces, data payload from the ACS to the UE via the first base station utilizing the first subset of time domain resources and the first set of spatial domain resources and via the second base station utilizing the second subset of time domain resources and the second set of spatial domain resources.

Aspect 2. The method of the preceding aspect, wherein providing the at least one of the first information or the second information to the UE via the one or more radio interfaces includes providing both the first information and the second information to the UE via the one or more radio interfaces.

Aspect 3. The method of any one of the preceding aspects, further comprising prior to the providing: allocating, by the processing hardware, the first subset of time domain resources for use by the first base station of the ACS to deliver communications between the ACS and the UE; and allocating, by the processing hardware, the second subset of time domain resources for use by the second base station of the ACS to deliver communications between the ACS and the UE.

Aspect 4. The method of aspect 3, wherein the allocating of the first subset of time domain resources for use by the first base station and the allocating of the second subset of time domain resources for use by the second base station include allocating the plurality of time domain resources in a round-robin manner among the plurality of base stations of the ACS.

Aspect 5. The method of aspect 3, wherein at least one of the allocating of the first subset of time domain resources for use by the first base station or the allocating of the second subset of time domain resources for use by the second base station is based on respective loads of one or more base stations of the ACS.

Aspect 6. The method of any one of the preceding aspects, wherein transmitting the data payload from the ACS to the UE via the first base station and via the second base station includes transmitting the data payload from the ACS to the UE via a first beam formed by the first base station and via a second beam formed by the second base station.

Aspect 7. The method of the preceding aspect, wherein: a first beam identifier uniquely identifies the first beam and a second beam identifier uniquely identifies the second beam; providing the first information to the UE includes providing an indication of the first beam identifier to the UE; wherein providing the second information to the UE includes providing an indication of the second beam identifier to the UE.

Aspect 8. The method of any one of the preceding claims, wherein: providing, to the UE, the first information includes providing, to the UE, a first schedule via which the first base station is configured to communicate, the first schedule indicating the first subset of time domain resources; providing, to the UE, the second information includes providing, to the UE, a second schedule via which the second base station is configured to communicate, the second schedule indicating the second subset of time domain resources; and transmitting the data payload to the UE via the first base station utilizing the first subset of time domain resources and via the second base station utilizing the second subset of time domain resources includes transmitting at least a first portion of the data payload and at least a second portion of the data payload via the first base station and the second base station, respectively, in accordance with the first schedule and the second schedule.

Aspect 9. The method of any one of the preceding aspects, wherein: providing, by the processing hardware, the first information to the UE via the one or more radio interfaces includes generating, by processing hardware of the first base station, a first pilot signal associated with the first beam formed by the first base station; and providing, by the processing hardware, the second information to the UE via the one or more radio interfaces includes generating, by processing hardware of the second base station, a second pilot signal associated with the second beam formed by the second base station.

Aspect 10. The method of any one of aspects 1 to 8, wherein providing, by the processing hardware, the at least one of the first information or the second information to the UE via the one or more radio interfaces includes providing, by the processing hardware, the at least one of the first information or the second information to the UE via a control channel of the ACS.

Aspect 11. The method of aspect 10, wherein the control channel of the ACS is collectively formed by more than one base station of the ACS.

Aspect 12. The method of any one of aspects 10-11, further comprising: redundantly delivering, by the processing hardware via the one or more radio interfaces, at least a portion of the data payload to the UE from the ACS via both a first beam formed by the ACS and a second beam formed by the ACS, and providing, by the processing hardware via the control channel of the ACS to the UE, an indication of the redundancy.

Aspect 13. The method of aspect 12, wherein redundantly delivering the at least the portion of the data payload via both the first beam and the second beam includes delivering the at least the portion of the data payload via the first beam, and subsequently delivering a retransmission of the at least the portion of the data payload via the second beam.

Aspect 14. The method of aspect 13, further comprising initiating the subsequent delivering of the retransmission of the at least the portion of the data payload via the second beam based upon at least one of: respective channel qualities of one or more base stations included in the ACS, or a cumulative channel quality of the plurality of base stations included in the ACS.

Aspect 15. The method of any one of aspects 12-14, wherein the at least the portion of the data payload is a first redundant portion of the data payload, the indication of the redundancy is an indication of a first redundancy scheme, and the method further comprises: providing, by the processing hardware via the control channel of the ACS to the UE, an indication of a second redundancy scheme corresponding to a second redundant portion of the data payload different from the first redundant portion of the data payload, the second redundancy scheme being different from the first redundancy scheme; and redundantly delivering, via the processing hardware via the one or more radio interfaces, the second redundant portion of the data payload via two or more beams formed by the ACS.

Aspect 16. The method of any one of the preceding aspects, wherein the first subset of time domain resources and the second subset of time domain resources recur over time in a pattern.

Aspect 17. The method of any one of the preceding aspects, wherein at least one time domain resource is included in both the first subset of time domain resources and in the second subset of time domain resources.

Aspect 18. The method of any one of aspects 1 to 16, wherein the first subset of time domain resources and the second subset of time domain resources are mutually exclusive subsets of time domain resources.

Aspect 19. The method of any one of the preceding aspects, further comprising distributing, by the processing hardware, an indication of a plurality of modulation coding schemes to each base station included in the ACS, and wherein transmitting, by the processing hardware of the wireless network system, the data payload from the ACS to the UE via the first base station and via the second base station includes encoding, by processing hardware of the first base station, a respective at least a subset of the data payload using the first modulation coding scheme and encoding, by the processing hardware of the second base station, a respective at least a subset of the data payload using the second modulation coding scheme.

Aspect 20. The method of the preceding aspect, wherein the first modulation coding scheme and the second modulation coding scheme are different modulation coding schemes.

Aspect 21. The method of any one of the preceding aspects, wherein at least a portion of the method is performed by a centralized controller that is communicatively connected to each base station included in the plurality of base stations.

Aspect 22. The method of the preceding aspect, wherein the centralized controller is included in an Active Coordination Set Server of the wireless network system that administrates respective ACSs for respective UEs.

Aspect 23. The method of any one of the preceding aspects, wherein at least a portion of the method is performed via peer-to-peer communications between at least two base stations included in the plurality of base stations.

Aspect 24. The method of any one of the preceding aspects, further comprising: obtaining, by the processing hardware of the wireless network system from the UE via the one or more radio interfaces, an indication of a set of candidate base stations for the ACS; and determining, by the processing hardware, the plurality of base stations included the ACS of the UE based on the set of candidate base stations.

Aspect 25. The method of the preceding aspect, further comprising: subsequently obtaining, by the processing hardware of the wireless network system from the UE, an indication of an updated set of candidate base stations for the ACS; and determining, by the processing hardware, an updated plurality of base stations included in the ACS of the UE based on the updated set of candidate base stations.

Aspect 26. The method of the preceding aspect, further comprising: re-allocating, by the processing hardware, at least one of: one or more time domain resources included in the first subset of time domain resources or one or more time domain resources included in the second subset of time domain resources for use by one or more base stations included in the updated plurality of base stations included in the ACS of the UE; and providing, by the processing hardware to the UE via the one or more radio interfaces, an indication of the reallocation.

Aspect 27. One or more non-transitory media respectively storing thereon instructions that, when executed by the processing hardware, cause the wireless network system to perform a method according to any of the preceding aspects.

Aspect 28. A method of enhancing reception of information at a user equipment (UE) from an Active Coordination Set (ACS), the ACS including a plurality of base stations, and the method comprising: receiving, by processing hardware of the UE via one or more radio interfaces, at least one of: first information indicative of (i) a first subset of time domain resources of a plurality of time domain resources allocated for use by a first base station of the ACS to deliver communications between the ACS and the UE, and (ii) a first set of spatial resources utilized by the first base station; or second information indicative of (i) a second subset of time domain resources of the plurality of time domain resources allocated for use by a second base station of the ACS to deliver communications between the ACS and the UE, and (ii) a second set of spatial resources utilized by the second base station; tuning, by the processing hardware of the UE, to the first set of spatial resources during the first subset of time domain resources and to the second set of spatial resources during the second subset of time domain resources; and receiving, by the processing hardware of the UE via the tuning, data payload transmitted from the ACS.

Aspect 29. The method of the preceding aspect, wherein receiving, by the processing hardware of the UE, the at least one of the first information or the second information includes receiving, by the processing hardware of the UE, both the first information and the second information.

Aspect 30. The method of any one of aspects 28 or 29, wherein the first subset of time domain resources and the second subset of time domain resources recur over time in a pattern.

Aspect 31. The method of any one of aspects 28-30, wherein the first subset of time domain resources and the second subset of time domain resources are mutually exclusive subsets of time domain resources.

Aspect 32. The method of the preceding aspect, wherein tuning to the first set of spatial resources during the first subset of time domain resources and to the second set of spatial resources during the second subset of time domain resources includes sequentially tuning to each base station of the ACS in a round-robin manner.

Aspect 33. The method of any one of aspects 28-32, wherein at least one time domain resource is included in both the first subset of time domain resources and in the second subset of time domain resources.

Aspect 34. The method of any one of aspects 28-33, wherein: tuning to the first set of spatial resources during the first subset of time domain resources includes tuning to a first beam formed by the first base station using the first set of spatial resources and the first subset of time domain resources; and tuning to the second set of spatial resources during the second subset of time domain resources includes tuning to a second beam formed by the second base station using the second set of spatial resources and the second subset of time domain resources.

Aspect 35. The method of aspect 34, wherein: a first beam identifier uniquely identifies the first beam and a second beam identifier uniquely identifies the second beam; receiving the first information includes receiving the first beam identifier; and receiving the second information includes receiving the second beam identifier Aspect 36. The method of any one of aspects 32-35, wherein receiving, by the processing hardware of the UE via the tuning, the data payload transmitted from the ACS includes redundantly receiving a particular portion of the data payload.

Aspect 37. The method of aspect 36, wherein redundantly receiving the particular portion of the data payload includes redundantly receiving the particular portion of the data payload via both a first beam formed by utilizing the first subset of time domain resources and a second beam formed by utilizing the second subset of time domain resources.

Aspect 38. The method of aspect 37, wherein redundantly receiving the particular portion of the data payload via both the first beam and the second beam includes redundantly receiving the particular portion of the data payload via at least one common time domain resource that is included in both the first subset of time domain resources utilized to form the first beam and the second subset of time domain resources utilized to form the second beam.

Aspect 39. The method of any one of aspects 36-38, wherein redundantly receiving the particular portion of the data payload includes receiving the particular portion of the data payload and subsequently receiving the particular portion of the data payload.

Aspect 40. The method of any one of aspects 28-39, wherein: receiving the first information includes receiving a first schedule via which the first base station is configured to communicate, the first schedule indicating the first subset of time domain resources; receiving the second information includes receiving a second schedule via which the second base station is configured to communicate, the second schedule indicating the second subset of time domain resources; and tuning to the first set of spatial resources during the first subset of time domain resources and to the second set of spatial resources during the second subset of time domain resources includes tuning to respective subsets of time domain resources in accordance with at least one of the first schedule or the second schedule.

Aspect 41. The method of any one of aspects 28-40, wherein: receiving, by the processing hardware of the UE, the first information via the one or more radio interfaces includes receiving, by the processing hardware of the UE via the one or more radio interfaces, a first pilot signal generated by the first base station; and receiving, by the processing hardware the UE, the second information via the one or more radio interfaces includes receiving, by the processing hardware of the UE via the one or more radio interfaces, a second pilot signal generated by the second base station.

Aspect 42. The method of any one of aspects 28-40, wherein receiving, by the processing hardware of the UE, the at least one of the first information or the second information via the one or more radio interfaces includes receiving, by the processing hardware of the UE via the one or more radio interfaces, the at least one of the first information or the second information via a control channel of the ACS.

Aspect 43. The method of the preceding aspect, wherein the control channel of the ACS is collectively formed by more than one base station of the ACS.

Aspect 44. The method of any one of aspects 28-43, wherein the first subset of time domain resources includes a first subset of time slots and the second subset of time domain resources includes a second subset of time slots.

Aspect 45. The method of the preceding aspect, wherein the first subset of time slots is included in a first subset of time-frequency slots and the second subset of time slots is included in a second subset of time-frequency slots.

Aspect 46. The method of any one of aspects 28-45, wherein a total number of time domain resources included in the first subset of time domain resources differs from a total number of time domain resources included in the second subset of time domain resources.

Aspect 47. The method of any one of aspects 28-46, wherein at least a portion of the one or more radio interfaces operate in a 3.5 GHz band.

Aspect 48. The method of any one of aspects 28-47, wherein at least a portion of the one or more radio interfaces operate in a mmWave frequency band.

What is claimed is:

1. A method of enhancing reception of information at a user equipment (UE) from an Active Coordination Set (ACS), the ACS including a plurality of base stations, and the method comprising:
   selecting, by the ACS of a wireless network system, a redundancy scheme from a plurality of sequential data payload redundancy schemes corresponding to a plurality of time domain resources;
   providing, by the ACS of the wireless network system to the UE via one or more radio interfaces and one or more pilot signals generated by the plurality of base stations, an indication of the redundancy scheme and at least one of:
      first information indicative of (i) a first subset of N time domain resources of a plurality of time domain resources allocated for use by a first base station of the ACS to deliver communications between the ACS and the UE, and (ii) a first beam identifier uniquely identifying a first set of spatial domain resources utilized by the ACS; or
      second information indicative of (i) a second subset of M time domain resources of the plurality of time domain resources allocated for use by a second base station of the ACS to deliver communications between the ACS and the UE, with M≠N, and (ii) a second beam identifier uniquely identifying a second set of spatial domain resources utilized by the ACS, with the second set of spatial domain resources different from the first set of spatial domain resources;
   jointly transmitting, from the ACS to the UE via two or more radio interfaces, a data payload utilizing the first subset of time domain resources and the first set of spatial domain resources and also utilizing the second subset of time domain resources and the second set of spatial domain resources; and
   jointly retransmitting, from the ACS to the UE via the two or more radio interfaces in accordance with the redundancy scheme, at least a portion of the data payload using the first set of spatial domain resources and the second set of spatial domain resources.

2. The method of claim 1, wherein at least one of allocating of the first subset of time domain resources for use by the first base station or allocating of the second subset of time domain resources for use by the second base station include allocating the plurality of time domain resources in a round-robin manner among the plurality of base stations of the ACS.

3. The method of claim 1, wherein at least one of allocating of the first subset of time domain resources for use by the first base station or allocating of the second subset of time domain resources for use by the second base station is based on respective loads of one or more base stations of the ACS.

4. The method of claim 1, further comprising providing the at least one of the first information or the second information to the UE via a control channel of the ACS.

5. The method of claim 1, wherein the jointly retransmitting further comprises:
   jointly redundantly delivering at least a portion of the data payload via both the first set of spatial domain resources and the second set of spatial domain resources; and
   subsequently delivering a retransmission of the at least the portion of the data payload via only the second set of spatial domain resources.

6. The method of claim 5, further comprising initiating the subsequent delivering of the retransmission of the at least the portion of the data payload via the second set of spatial domain resources based upon at least one of: respective channel qualities of one or more base stations included in the ACS, or a cumulative channel quality of the plurality of base stations included in the ACS.

7. The method of claim 5, wherein the at least the portion of the data payload is a first redundant portion of the data payload, the indication of the redundancy scheme is an indication of a first redundancy scheme, and the method further comprises:
   providing, via a control channel of the ACS to the UE, an indication of a second redundancy scheme corresponding to a second redundant portion of the data payload different from the first redundant portion of the data payload, the second redundancy scheme being different from the first redundancy scheme; and
   redundantly delivering, via the one or more radio interfaces, the second redundant portion of the data payload via two or more beams formed by the ACS.

8. The method of claim 1, further comprising:
   obtaining, by the wireless network system from the UE via the one or more radio interfaces, an indication of a set of candidate base stations for the ACS; and
   determining, by the wireless network system, the plurality of base stations included the ACS of the UE based on the set of candidate base stations.

9. The method of claim 8, further comprising:
   subsequently obtaining, by the wireless network system from the UE, an indication of an updated set of candidate base stations for the ACS; and
   determining an updated plurality of base stations included in the ACS of the UE based on the updated set of candidate base stations.

10. The method of claim 9, further comprising:
    re-allocating at least one of: one or more time domain resources included in the first subset of time domain resources or one or more time domain resources included in the second subset of time domain resources for use by one or more base stations included in the updated plurality of base stations included in the ACS of the UE; and
    providing, to the UE via the one or more radio interfaces, an indication of the re-allocating.

11. A method of enhancing reception of information at a user equipment (UE) from an Active Coordination Set (ACS), the ACS including a plurality of base stations, and the method comprising:

receiving, from the ACS by the UE via one or more radio interfaces and one or more pilot signals generated by the plurality of base stations, an indication of a redundancy scheme from a plurality of sequential data payload redundancy schemes corresponding to a plurality of time domain resources and at least one of:

first information indicative of (i) a first subset of N time domain resources of a plurality of time domain resources allocated for use by a first base station of the ACS to deliver communications between the ACS and the UE, and (ii) a first beam identifier uniquely identifying a first set of spatial domain resources utilized by the ACS; or second information indicative of (i) a second subset of M time domain resources of the plurality of time domain resources allocated for use by a second base station of the ACS to deliver communications between the ACS and the UE, with M≠N, and (ii) a second beam identifier uniquely identifying a second set of spatial domain resources utilized by the ACS, with the second set of spatial domain resources different from the first set of spatial domain resources;

tuning, by the UE, to the first set of spatial resources during the first subset of time domain resources and to the second set of spatial resources during the second subset of time domain resources;

receiving, from the ACS by the UE via the tuning, a data payload transmitted from the ACS utilizing the first subset of time domain resources and the first set of spatial domain resources and also utilizing the second subset of time domain resources and the second set of spatial domain resources; and receiving, from the ACS by the UE in accordance with the redundancy scheme, at least a portion of the data payload using the first set of spatial domain resources and the second set of spatial domain resources.

12. The method of claim 11, wherein the first subset of time domain resources and the second subset of time domain resources are mutually exclusive subsets of time domain resources.

13. The method of claim 11, wherein at least one time domain resource is included in both the first subset of time domain resources and in the second subset of time domain resources.

14. The method of claim 11, wherein receiving the data payload includes:

redundantly receiving a particular portion of the data payload via both a first beam formed by utilizing the first subset of time domain resources and a second beam formed by utilizing the second subset of time domain resources.

15. The method of claim 11, further comprising receiving, by the UE, the at least one of the first information or the second information via a control channel of the ACS.

16. The method of claim 11, further comprising:

receiving, by the UE, at least a portion of the data payload via a first beam; and receiving, by the UE, a retransmission of the at least the portion of the data payload via a second beam.

17. The method of claim 11, further comprising determining, by the UE, an updated set of candidate base stations for the ACS, and transmitting an indication of the updated set of candidate base stations to a wireless network system in which the plurality of base stations is included.

18. The method of claim 17, wherein the tuning is a first tuning, and the method further comprises:

receiving, by the UE, an indication of a reallocation of at least one of: one or more time domain resources included in the first subset of time domain resources or one or more time domain resources included in the second subset of time domain resources for use by one or more base stations included in an updated plurality of base stations included in the ACS of the UE, the updated plurality of base stations determined based on the updated set of candidate base stations;

second tuning, by the UE, to the reallocation of one or more time domain resources; and receiving, by the UE via the second tuning, subsequent data payload transmitted from the ACS.

* * * * *